United States Patent
Park et al.

(10) Patent No.: US 12,362,905 B2
(45) Date of Patent: Jul. 15, 2025

(54) COMPUTING APPARATUS AND METHOD OF INTEGRATING DIFFERENT HOMOMORPHIC OPERATIONS IN HOMOMORPHIC ENCRYPTION

(71) Applicant: ELECTRONICS AND TELECOMMUNICATIONS RESEARCH INSTITUTE, Daejeon (KR)

(72) Inventors: Seong-Cheon Park, Daejeon (KR); Hyunwoo Kim, Daejeon (KR); Jung-Chan Na, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 200 days.

(21) Appl. No.: 18/077,621

(22) Filed: Dec. 8, 2022

(65) Prior Publication Data

US 2023/0188320 A1    Jun. 15, 2023

(30) Foreign Application Priority Data

Dec. 9, 2021 (KR) .................. 10-2021-0176079
Nov. 15, 2022 (KR) .................. 10-2022-0152341

(51) Int. Cl.
*H04L 9/06* (2006.01)
*H04L 9/00* (2022.01)

(52) U.S. Cl.
CPC ............ *H04L 9/008* (2013.01); *H04L 9/0618* (2013.01)

(58) Field of Classification Search
CPC .................. H04L 9/008; H04L 9/0618
See application file for complete search history.

(56) References Cited

U.S. PATENT DOCUMENTS 8,515,058 B1 * 8/2013 Gentry ............... H04L 9/008
                                                    380/28
9,716,590 B2 * 7/2017 Gentry ............. H04L 9/3093
(Continued)

FOREIGN PATENT DOCUMENTS

CN      112685760 A * 4/2021
JP        5053179 B2   10/2012
(Continued)

OTHER PUBLICATIONS

Chen, Hao et al., "Improved Bootstrapping for Approximate Homomorphic Encryption", EuroCrypt 2019, LNCS 11477, pp. 34-54, 2019. (Year: 2019).*
(Continued)

*Primary Examiner* — David Garcia Cervetti
(74) *Attorney, Agent, or Firm* — Rabin & Berdo, P.C.

(57) ABSTRACT

A method of integrating different homomorphic operations in homomorphic encryption is provided. The method includes receiving a homomorphic ciphertext and encryption scheme information from a ciphertext generating apparatus by using a communication interface, performing a homomorphic multiplication operation on the homomorphic ciphertext by using a homomorphic multiplication operator, analyzing the encryption scheme information to determine one operation of a re-linearization operation performed by a re-linearization operator and a key switching operation performed by a key switching operator by using a main controller, performing the determined one operation by using the re-linearization operator or the key switching operator, and performing a modulus switching operation on an operation result of the determined one operation by using a modulus switching operator.

14 Claims, 3 Drawing Sheets

(56) References Cited

U.S. PATENT DOCUMENTS

| | | | | |
|---|---|---|---|---|
| 10,116,437 | B1* | 10/2018 | Krendelev | H04L 63/0457 |
| 10,541,805 | B2* | 1/2020 | Laine | H04L 9/008 |
| 10,778,410 | B2* | 9/2020 | Han | H04L 9/30 |
| 11,115,182 | B2* | 9/2021 | Cheon | H04L 63/0428 |
| 11,374,736 | B2* | 6/2022 | Gao | H04L 9/3093 |
| 12,001,577 | B1* | 6/2024 | Xiong | G06N 3/04 |
| 12,099,997 | B1* | 9/2024 | Hoffberg | G06Q 20/065 |
| 2011/0243320 | A1* | 10/2011 | Halevi | H04L 9/0861 380/30 |
| 2012/0039473 | A1* | 2/2012 | Gentry | H04L 9/3026 380/277 |
| 2013/0170640 | A1* | 7/2013 | Gentry | H04L 9/008 380/30 |
| 2013/0216044 | A1* | 8/2013 | Gentry | H04L 9/008 380/277 |
| 2015/0312031 | A1* | 10/2015 | Seo | H04L 9/008 380/28 |
| 2016/0133164 | A1* | 5/2016 | Yoshida | H04L 9/008 713/189 |
| 2016/0330017 | A1* | 11/2016 | Youn | H04L 9/304 |
| 2017/0134156 | A1* | 5/2017 | Laine | H04L 9/008 |
| 2017/0155628 | A1* | 6/2017 | Rohloff | H04L 63/02 |
| 2017/0177899 | A1* | 6/2017 | Ng | G06F 16/1748 |
| 2017/0244553 | A1* | 8/2017 | Savry | G06F 21/72 |
| 2018/0096248 | A1* | 4/2018 | Chabanne | G06N 3/08 |
| 2018/0375639 | A1* | 12/2018 | Lauter | H04L 9/008 |
| 2018/0375640 | A1* | 12/2018 | Laine | H04L 9/008 |
| 2019/0007197 | A1* | 1/2019 | Laine | H04L 9/3093 |
| 2019/0363871 | A1* | 11/2019 | Cheon | H04L 9/304 |
| 2020/0151356 | A1* | 5/2020 | Rohloff | G06F 21/6245 |
| 2020/0177366 | A1* | 6/2020 | Han | H04L 9/3239 |
| 2020/0204341 | A1* | 6/2020 | Williams | G06N 3/08 |
| 2020/0228307 | A1* | 7/2020 | Cheon | H04L 9/3093 |
| 2020/0252199 | A1* | 8/2020 | Cheon | H04L 9/3093 |
| 2020/0320206 | A1* | 10/2020 | Cammarota | G06F 21/57 |
| 2020/0342787 | A1 | 10/2020 | Lee et al. | |
| 2021/0152326 | A1 | 5/2021 | Lee et al. | |
| 2021/0248263 | A1* | 8/2021 | van Liesdonk | G06F 21/6227 |
| 2021/0326439 | A1* | 10/2021 | Hoang | G06F 21/562 |
| 2021/0344479 | A1* | 11/2021 | Lee | H04L 9/008 |
| 2021/0351913 | A1* | 11/2021 | No | H04L 9/008 |
| 2021/0399872 | A1* | 12/2021 | Chen | H04L 9/0631 |
| 2021/0399874 | A1* | 12/2021 | Polyakov | H04L 9/085 |
| 2022/0035951 | A1* | 2/2022 | Emmadi | G06F 21/6263 |
| 2022/0085972 | A1* | 3/2022 | Jackson, II | H04L 9/008 |
| 2022/0100889 | A1* | 3/2022 | Tan | G06F 21/6245 |
| 2022/0116198 | A1* | 4/2022 | Na | H04L 9/3093 |
| 2022/0166599 | A1* | 5/2022 | Fukuda | H04L 9/008 |
| 2022/0385461 | A1* | 12/2022 | Eom | H04L 9/0618 |
| 2023/0012099 | A1* | 1/2023 | Papadimitriou | H04L 9/0618 |
| 2023/0027423 | A1* | 1/2023 | Rao | G06F 7/5443 |
| 2023/0112840 | A1* | 4/2023 | Micciancio | H04L 9/085 713/189 |
| 2023/0119749 | A1* | 4/2023 | Micciancio | H04L 9/0618 380/277 |
| 2023/0141837 | A1* | 5/2023 | Moon | H04L 9/0894 713/189 |
| 2023/0188320 | A1* | 6/2023 | Park | H04L 9/0618 380/28 |
| 2023/0208611 | A1* | 6/2023 | Cheon | H04L 9/008 380/28 |
| 2023/0325529 | A1* | 10/2023 | Sav | G06F 21/6245 726/26 |
| 2023/0361986 | A1* | 11/2023 | Genise | G06F 9/3887 |
| 2024/0062053 | A1* | 2/2024 | Tan | G06N 3/084 |
| 2024/0267222 | A1* | 8/2024 | Chillotti | H04L 9/3093 |
| 2024/0313958 | A1* | 9/2024 | Ding | H04L 9/0861 |

FOREIGN PATENT DOCUMENTS

| | | | |
|---|---|---|---|
| KR | 1020210067961 | A | 6/2021 |
| KR | 102304992 | B1 | 9/2021 |

OTHER PUBLICATIONS

Andrey Kim et al., "Revisiting Homomorphic Encryption Schemes for Finite Fields", Oct. 31, 2022.

Jonathan Takeshita et al., "Algorithmic Acceleration of B/FV-like Somewhat Homomorphic Encryption for Compute-Enabled RAM", May 17, 2021.

* cited by examiner

COMPUTING APPARATUS AND METHOD OF INTEGRATING DIFFERENT HOMOMORPHIC OPERATIONS IN HOMOMORPHIC ENCRYPTION

CROSS-REFERENCE TO RELATED APPLICATIONS

This application claims the benefit of the Korean Patent Application No. 10-2021-0176079 filed on Dec. 9, 2021 and the Korean Patent Application No. 10-2022-0152341 filed on Nov. 15, 2022, which is hereby incorporated by reference as if fully set forth herein.

BACKGROUND

Field of the Invention

The present invention relates to homomorphic encryption technology, and more particularly, to technology for integrating different homomorphic operations (or homomorphic arithmetic operations or homomorphic computations) in homomorphic encryption schemes.

Discussion of the Related Art

Homomorphic encryption technology is an encryption scheme, which performs a computation in a state where original data (for example, a message or a plaintext) is encrypted, and has a feature where a computation result of original data is the same as a computation result of encrypted data (for example, a ciphertext). Based on such a feature, the homomorphic encryption technology may perform a computation in a state where data is encrypted, without decrypting the encrypted data.

Such homomorphic encryption technology may store sensitive data requiring privacy protection in an external medium in a state where the data is encrypted, or may be usefully used for requesting a combination and a computation of data from the external medium (for example, a commercial cloud server) in an encrypted state.

A ciphertext defined in the homomorphic encryption technology may be mathematically expressed as higher-order polynomials of order n. That is, an operation of generating a ciphertext in the homomorphic encryption technology denotes an operation of converting the ciphertext into higher-order polynomials of order n. Therefore, because the homomorphic encryption technology performs a homomorphic operation on higher-order polynomials, a number of operations are performed, and due to this, an operation processing speed is reduced. This is one of factors which are difficult to practically use the homomorphic encryption technology.

Moreover, examples of the homomorphic encryption technology include various homomorphic encryption schemes known to those skilled in the art. The known encryption schemes have similarity in that a ciphertext expressed as higher-order polynomials of order n is used in common, but define different homomorphic operations. This denotes that compatibility between homomorphic encryption application systems designed as different homomorphic encryption systems is insufficient.

SUMMARY

An aspect of the present invention is directed to providing a computing apparatus and method which decrease a long operation processing time caused by a number of operations of homomorphic encryption and integrate different homomorphic operations defined in different homomorphic encryption schemes.

Another aspect of the present invention is directed to providing an imprinting apparatus and an imprinting method.

To achieve these and other advantages and in accordance with the purpose of the invention, as embodied and broadly described herein, there is provided a method of integrating different homomorphic operations in homomorphic encryption in a computing apparatus, the method including: receiving a homomorphic ciphertext and encryption scheme information from a ciphertext generating apparatus by using a communication interface; performing a homomorphic multiplication operation on the homomorphic ciphertext by using a homomorphic multiplication operator; analyzing the encryption scheme information to determine one operation of a re-linearization operation performed by a re-linearization operator and a key switching operation performed by a key switching operator by using a main controller; performing the determined one operation by using the re-linearization operator or the key switching operator; and performing a modulus switching operation on an operation result of the determined one operation by using a modulus switching operator.

In another aspect of the present invention, there is provided a computing apparatus including: a communication interface configured to receive a homomorphic ciphertext and encryption scheme information from a ciphertext generating apparatus; a homomorphic multiplication operator configured to perform a homomorphic multiplication operation on the homomorphic ciphertext; a second operator configured to perform a re-linearization operation on an operation result of the homomorphic multiplication operation; a third operator configured to perform a key switching operation on the operation result of the homomorphic multiplication operation; and a fourth operator configured to perform a modulus switching operation on an operation result of the re-linearization operation or an operation result of the key switching operation, wherein the computing apparatus further includes: a main controller configured to generate a selection signal, based on the encryption scheme information; and a selector configured to input the operation result of the homomorphic multiplication operation to the second operator or the third operator, based on the selection signal.

In an embodiment, the first operator, the second operator, the third operator, the fourth operator, and the selector may be integrated into one dedicated chip.

In an embodiment, the main controller may analyze the encryption scheme information to determine an encryption scheme of the homomorphic ciphertext and may generate the selection signal corresponding to the determined encryption scheme In an embodiment, when the encryption scheme is the BFV scheme or the CKKS scheme, the main controller may generate the selection signal for inputting an operation result of the homomorphic multiplication operation to the second operator, and when the encryption scheme is the BGVS scheme, the main controller may generate the selection signal for inputting the operation result of the homomorphic multiplication operation to the third operator.

In an embodiment, the encryption scheme information may include information for identifying a bit position representing an error value in a bit string constituting the homomorphic ciphertext.

In an embodiment, when the bit position representing the error value is a lower bit, the main controller may generate the selection signal for inputting an operation result of the homomorphic multiplication operation to the second operator, and when the bit position representing the error value is an upper bit, the main controller may generate the selection signal for inputting the operation result of the homomorphic multiplication operation to the third operator.

In an embodiment, the selector may include a de-multiplexer.

In an embodiment, the first operator may include a logic circuit implemented based on a number theoretic transform (NTT) technique and a residue number system (RNS) technique, so as to perform high-speed parallel processing on the homomorphic multiplication operation.

It is to be understood that both the foregoing general description and the following detailed description of the present invention are exemplary and explanatory and are intended to provide further explanation of the invention as claimed.

DETAILED DESCRIPTION OF THE INVENTION

Figure 1:
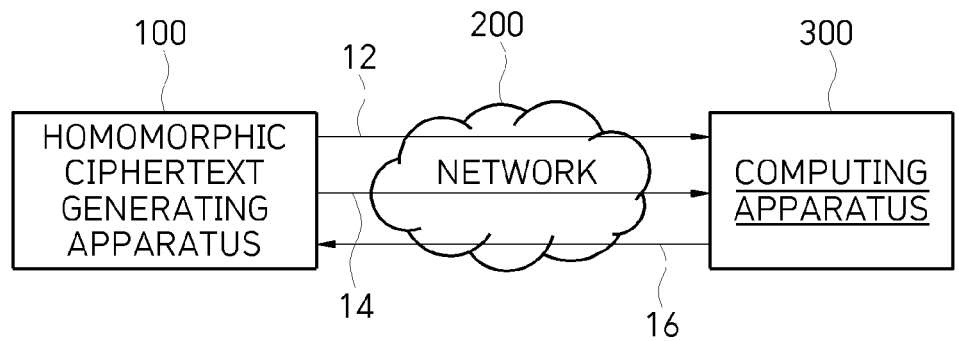
FIG. 1 is a block diagram of a whole system according to an embodiment of the present invention.

In the following description, the technical terms are used only for explain a specific exemplary embodiment while not limiting the present invention. The terms of a singular form may include plural forms unless referred to the contrary. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present invention may provide a method and apparatus of integrating homomorphic operations which are differently defined in homomorphic encryptions schemes. First, in order to help understand the present invention, some technical terms will be briefly described below.

Homomorphic Encryption Scheme

Examples of homomorphic encryption technology may include various encryption schemes. Herein, a BGV scheme, a BFV scheme, and a CKKS scheme among the encryption schemes known to those skilled in the art will be described. Here, BGV may be an acronym of Brakerski, Gentry, and Vaikuntanathan, and BFV may be an acronym of Brakerski, Fan, and Vercauteren. Also, CKKS may be an acronym of Cheon, Kim, Kim, and Song.

Such encryption schemes may encrypt a message (or data) as a homomorphic ciphertext, based on definition of ring-learning with error (R-LWE). An encryption process may generate the homomorphic ciphertext through a process of mapping a message to n-order polynomials to generate message polynomials, a process of adding an error value to the message polynomials which are referred to as error polynomials, and a ciphertext generating process of adding encryption key polynomials to the message polynomials.

The BGV scheme, the BFV scheme, and the CKKS scheme may have similarity in that a ciphertext expressed as higher-order polynomials of order n is used, but may define different homomorphic operations.

In each encryption scheme, in a bit string constituting a homomorphic ciphertext, bit positions of bits representing an error value added in a process of generating the homomorphic ciphertext may differ. Based on such a characteristic, the BGV scheme, the BFV scheme, and the CKKS scheme may define different homomorphic operations.

The present invention may provide a method and apparatus of integrating homomorphic operations which are differently defined in each encryption scheme, instead of modifying and improving an algorithm defined in encryption schemes such as the BGV, BFV, and CKKS schemes. Accordingly, detailed descriptions of each encryption scheme may be replaced with descriptions of technical documents known to those skilled in the art.

Homomorphic Operation or Homomorphic Arithmetic Operation

Homomorphic encryption technology may enable an operation and a combination of data (homomorphic ciphertext) encrypted based on a mathematical characteristic referred to as a homomorphic operation.

The homomorphic operation may include an encryption operation, a decryption operation, a homomorphic multiplication operation, a modular operation, a re-linearization operation, a key switching operation, and a modulus switching operation.

The encryption operation and the decryption operation may be homomorphic operations in an apparatus such as a client. Also, the homomorphic multiplication operation, the modular operation, the re-linearization operation, the key switching operation, and the modulus switching operation may be homomorphic operations performed in an apparatus such as a cloud server.

The present invention may integrate homomorphic operations performed in an apparatus such as a cloud server, instead of integrating homomorphic operations performed in an apparatus such as a client.

Encryption Operation

An encryption operation may be an operation of generating a homomorphic ciphertext, based on an algorithm defined in the BGV, BFV, or CKKS scheme. The present invention may not be characterized by modifying an encryption operation defined in each encryption scheme, and thus, a description thereof may be replaced with known technology. However, as described above, the BGV, BFV, and CKKS schemes may have similarity in that a ciphertext expressed as higher-order polynomials of order n is used, but may have a difference in that bit positions of bits representing an error value may differ in a bit string constituting a homomorphic ciphertext.

For example, the BFV or CKKS scheme may be defined so that a bit string constituting a homomorphic ciphertext includes upper bits corresponding to a message (or original data) and lower bits corresponding to an error value, and the BGV scheme may be defined to include upper bits corresponding to the error value and lower bits corresponding to the message. In this case, the upper bits may include a most significant bit, and the lower bits may include a least significant bit. Also, middle bits between the upper bits and the lower bits may be further provided.

Due to a position difference between bits representing an error value, a homomorphic operation process defined in the BGV scheme may differ from a homomorphic operation process defined in the BFV/CKKS scheme.

The present invention may be characterized in that one apparatus (for example, one dedicated chip) are performed in different homomorphic operation processes.

Decryption Operation

A decryption operation may be one of homomorphic operations and may be an operation of decrypting a resulting homomorphic ciphertext obtained by performing a homomorphic operation in a state where the homomorphic ciphertext is encrypted.

Homomorphic Multiplication Operation

A homomorphic multiplication operation may be one of homomorphic operations. A homomorphic ciphertext may be configured to include a ciphertext "ct1=(c0, c1)" and a ciphertext "ct2=(c'0, c'1)", and in this case, an operation result of the homomorphic multiplication operation may be (c0×c'0, c0×c'1+c1×c'0).

Moreover, a homomorphic addition operation performed in parallel with the homomorphic multiplication operation in a homomorphic ciphertext may be further performed, and an operation result of the homomorphic addition operation may be resulting polynomials "ct=(c0+c'0, c1+c'1)" obtained as a result of an addition of left polynomials (c0, c'0) and an addition of right polynomials (c1, c'1).

Modular Operation

A modular operation may be one of homomorphic operations and may be referred to as a modular multiplication operation.

In homomorphic encryption, the modular operation may be expressed as a higher-order polynomial where a homomorphic ciphertext obtained by encrypting a message has a coefficient value of a large word size and may have a characteristic of performing a homomorphic operation on the homomorphic ciphertext in an encrypted state, and thus, a modular operation or a modular reduction operation may be additionally performed under a condition where an irreducible polynomial is set instead of a homomorphic multiplication operation in homomorphic operations of polynomials.

The BGV, BFV, and CKKS schemes may identically define a homomorphic multiplication operation, a homomorphic addition operation, and a modulus operation of higher-order polynomials having a coefficient value of a large word size. Accordingly, homomorphic operations defined in the BGV, BFV, and CKKS schemes may be integrated into one device or one process.

Re-linearization Operation

A re-linearization operation may be one of homomorphic operations and may be referred to as a bootstrapping operation. Homomorphic encryption may apply ring-learning with error (R-LWE) so as to provide the high security of a message. This may denote that an error value (or an error value polynomial) having a coefficient value of a small word size is added to a ciphertext of a higher-order polynomial having a coefficient value of a large word size in encrypting a message. Therefore, a homomorphic ciphertext unable to know an original message may be generated.

In the BFV and CKKS schemes, because lower bits constituting a homomorphic ciphertext represent an error value (or a size value) and upper bits constituting the homomorphic ciphertext represent a message, when a homomorphic operation(s) such as a homomorphic multiplication operation and/or a modular operation are repeatedly performed on the homomorphic ciphertext, a word size of the error value representing the lower bit may increase, and due to this, the message representing the upper bits may be contaminated. In this case, it may be unable to recover the message.

Therefore, the number of operations of a homomorphic operation may be appropriately limited so that a message is not contaminated, and a re-linearization operation of recovering a word size of an error value, which increases as a homomorphic operation is performed by the limited number of operations, to an original word size.

The BFV and CKKS schemes may identically define a re-linearization operation. This may provide a motive which enables a re-linearization operation, identically defined in the BFV and CKKS schemes, to be integrated into one apparatus or one process. However, the BGV scheme may not define a re-linearization operation. Accordingly, the present invention may provide a method which integrates a homomorphic operation, defined in the BGV scheme which not define a re-linearization operation, and a homomorphic operation, defined in the BFV/CKKS scheme which defines a re-linearization operation, into one apparatus or one process.

Key Switching Operation

A key switching operation may be one of homomorphic operations performed in an apparatus which may be referred to as a server and may be an operation of recovering an order of a higher-order polynomial, which increases in a process of performing a homomorphic operation including a homomorphic multiplication operation and a modulus operation, to an original order.

When a multiplication operation is repeatedly performed on a homomorphic ciphertext expressed as a higher-order polynomial of order n, an order of a homomorphic ciphertext which is an operation result may increase to order n+n, and thus, only when an order of a homomorphic ciphertext is recovered to order n which is an original order, a next operation may be performed.

The BGV, BFV, and CKKS schemes may define the same or similar key switching operations. This may provide a motive which enables homomorphic operations, defined in the BGV, BFV, and CKKS schemes, to be integrated into one apparatus or one process.

Modulus Switching Operation

A homomorphic ciphertext may be expressed as a higher-order polynomial of order n where a ciphertext obtained by encrypting a message has a coefficient value of a large word size. A homomorphic operation repeatedly performed on a homomorphic ciphertext may increase a word size of a coefficient value included in a polynomial. When the number of operations is more than the limited number of operations, an upper bit representing an operation result due to an overflow.

The modulus switching operation may be an operation of recovering a word size of a resulting homomorphic ciphertext, which increases by performing the homomorphic operations (for example, the homomorphic addition operation, the homomorphic multiplication operation, the modulus operation, the re-linearization operation, and the key switching operation), to an original size, and the BGV, BFV, and CKKS schemes may define the same or similar modulus switching operations. This may provide a motive which enables homomorphic operations, defined in the BGV, BFV, and CKKS schemes, to be integrated into one apparatus or one process.

Hereinabove, homomorphic operations have been described. The present invention may provide a method of integrating homomorphic operations, slightly differently defined in each homomorphic encryption scheme, into one apparatus (a dedicated chip) or one process instead of modifying each homomorphic operation. Accordingly, detailed descriptions of each homomorphic operation and a hardware logic circuit for implementing the homomorphic operations may be replaced with known technology.

Hereinafter, embodiments which integrates homomorphic operations, differently defined in each homomorphic encryption scheme, into one apparatus will be described in detail with reference to the accompanying drawings. In the drawings, like reference numerals refer to like elements, and repeated descriptions of like elements may be omitted.

FIG. 1 is a block diagram of a whole system according to an embodiment of the present invention.

Referring to FIG. 1, the whole system according to an embodiment of the present invention may include a homomorphic ciphertext generating apparatus 100, a computing apparatus 300, and a network 200 for wired or/and wireless communication therebetween.

The homomorphic ciphertext generating apparatus 100 may encrypt a message on the basis of an algorithm defined in various homomorphic encryption schemes such as the BGV, BFV, and CKKS schemes to generate a homomorphic ciphertext 12 and may transmit the homomorphic ciphertext 12 to the computing apparatus 300 over the network 200.

Moreover, the homomorphic ciphertext generating apparatus 100 may generate encryption scheme information for notifying the computing apparatus 300 of a homomorphic encryption scheme which is based on encryption of the homomorphic ciphertext 12 and may transmit the encryption scheme information to the computing apparatus 300 over the network 200.

Moreover, the homomorphic ciphertext generating apparatus 100 may receive, over the network 200, a resulting homomorphic ciphertext 16 which is an operation result finally obtained by performing a plurality of homomorphic operations on the homomorphic ciphertext 12 in an encrypted state and may decrypt the resulting homomorphic ciphertext 16.

Moreover, the homomorphic ciphertext generating apparatus 100 may be referred to as a client. The homomorphic ciphertext generating apparatus 100 may be configured to be included in an electronic device having a wired and/or wireless communication function.

The electronic device may be implemented as at least one of a smartphone, a tablet personal computer (PC), a mobile phone, a video phone, an e-book reader, a desktop PC, a laptop PC, a netbook PC, a personal digital assistant (PDA), a portable multimedia player (PMP), an MP3 player, a camera, a wearable device, various medical devices (for example, mobile medical devices (for example, a blood glucose monitoring device, a heartbeat measuring device, a blood pressure measuring device, and a body temperature measuring device), magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, an automation teller's machine (ATM), a point of sales (POS), and an Internet of things (IoT) device (for example, a light bulb, various sensor, a spring cooler device, a fire alarm, a temperature regulator, a street light, and fitness equipment).

The computing apparatus 300 may receive the homomorphic ciphertext and the encryption scheme information from the homomorphic ciphertext generating apparatus 100. The computing apparatus 300 may check an encryption scheme of the received homomorphic ciphertext on the basis of the encryption scheme information and may perform homomorphic operations on the homomorphic ciphertext 12 in an encrypted state on the basis of the checked encryption scheme.

The computing apparatus 300 may perform a plurality of homomorphic operations on the homomorphic ciphertext 12 to generate the resulting homomorphic ciphertext 16 and may transmit the resulting homomorphic ciphertext 16 to the homomorphic ciphertext generating apparatus 100 over the network 200.

The computing apparatus 300 may be referred to as a server or a cloud server.

The computing apparatus 300 may be implemented as at least one of a smartphone, a tablet personal computer (PC), a mobile phone, a video phone, an e-book reader, a desktop PC, a laptop PC, a netbook PC, a personal digital assistant (PDA), a portable multimedia player (PMP), an MP3 player, a camera, a wearable device, various medical devices (for example, mobile medical devices (for example, a blood glucose monitoring device, a heartbeat measuring device, a blood pressure measuring device, and a body temperature measuring device), magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, an automation teller's machine (ATM), a point of sales (POS), and an Internet of things (IoT) device (for example, a light bulb, various sensor, a spring cooler device, a fire alarm, a temperature regulator, a street light, and fitness equipment).

The network 200 may support a wired communication connection or a wireless communication connection between the homomorphic ciphertext generating apparatus 100 and the computing apparatus 300. The network 200 may include at least one of a computer network (for example, local area network (LAN) or wide LAN (WAN)), Internet, a mobile communication network, and a close-distance wireless communication network.

In FIG. 1, an example where the homomorphic ciphertext generating apparatus 100 and the computing apparatus 300 are physically split from each other is illustrated, but the present invention is not limited thereto and the homomorphic ciphertext generating apparatus 100 and the computing apparatus 300 may be integrated into one apparatus. In this case, the homomorphic ciphertext generating apparatus 100 may include the computing apparatus 300, or the homomorphic ciphertext generating apparatus 100 may be included in the computing apparatus 300.

Figure 2:
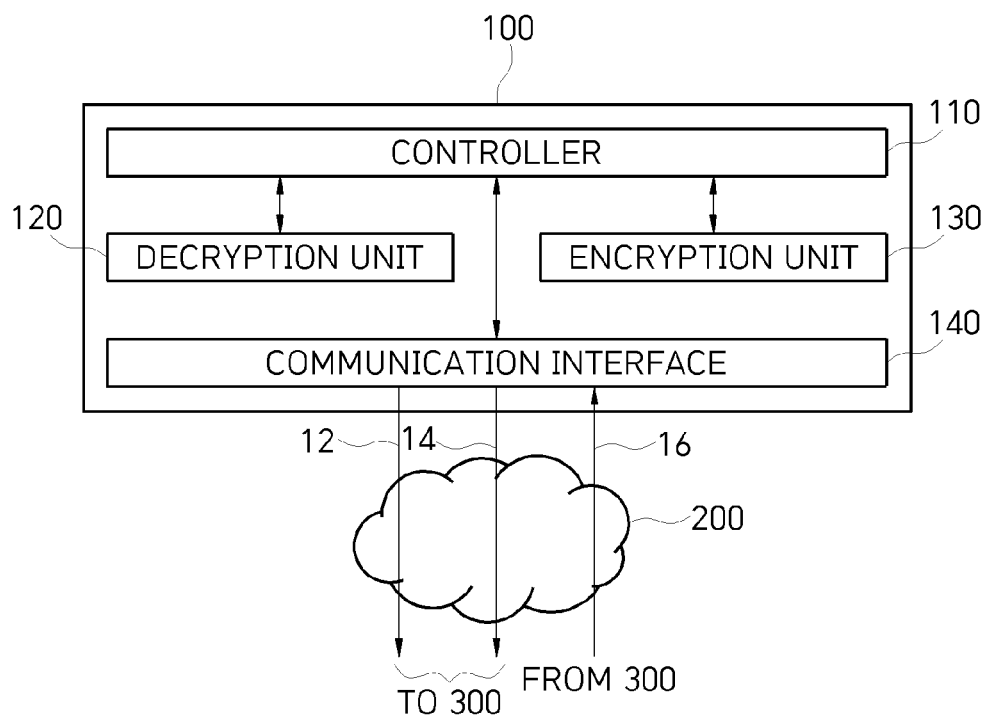
FIG. 2 is a schematic block diagram of a homomorphic ciphertext generating apparatus illustrated in FIG. 1.

FIG. 2 is a schematic block diagram of the homomorphic ciphertext generating apparatus 100 illustrated in FIG. 1.

Referring to FIG. 2, the homomorphic ciphertext generating apparatus 100 may include a controller 110, an encryption unit 120, a decryption unit 130, and a communication interface 140.

The controller 110 may be an apparatus which controls and manages overall operations of the encryption unit 120, the decryption unit 130, and the communication interface 140 and may be configured to include at least one processor and at least one memory. The processor may include one or more of a central processing unit (CPU), an application processor, and a communication processor (CP). The processor may execute an operation or data processing associated with the encryption unit 120, the decryption unit 130, and the communication interface 140. The memory may include a volatile and/or non-volatile memory. The memory may store, for example, instructions or data associated with the encryption unit 120, the decryption unit 130, and the communication interface 140.

Moreover, the controller 110 may generate encryption scheme information 14 for notifying the computing apparatus 300 of an encryption scheme used by the homomorphic ciphertext generating apparatus 100 and may transfer the encryption scheme information to the communication interface 140.

The encryption unit 120 may encrypt a message (or original data) on the basis of the encryption scheme according to control by the controller 110 to generate a homomorphic ciphertext 12 and may transfer the homomorphic ciphertext 12 to the communication interface 140.

The communication interface 140 may transmit the homomorphic ciphertext 12 and the encryption scheme information 14 to the computing apparatus 300 by using wired communication and/or wireless communication, based on control by the controller 110. Here, the wireless communication may include, for example, at least one of long term evolution (LTE), LTE advance (LTE-A), code division multiple access (CDMA), wideband CDMA (WCDMA), universal mobile telecommunications system (UMTS), wireless broadband (WiBro), global system for mobile communications (GSM), wireless fidelity (WiFi), Bluetooth, Bluetooth low energy (BLE), Zigbee, and near field communication (NFC).

Moreover, the communication interface 140 may receive a resulting homomorphic ciphertext 16, obtained by performing a plurality of homomorphic operations on the homomorphic ciphertext 12, from the computing apparatus 300 and may transfer the resulting homomorphic ciphertext 16 to the decryption unit 130.

The decryption unit 130 may decrypt the resulting homomorphic ciphertext 16 transferred from the communication interface 140, based on the encryption scheme.

Figure 3:
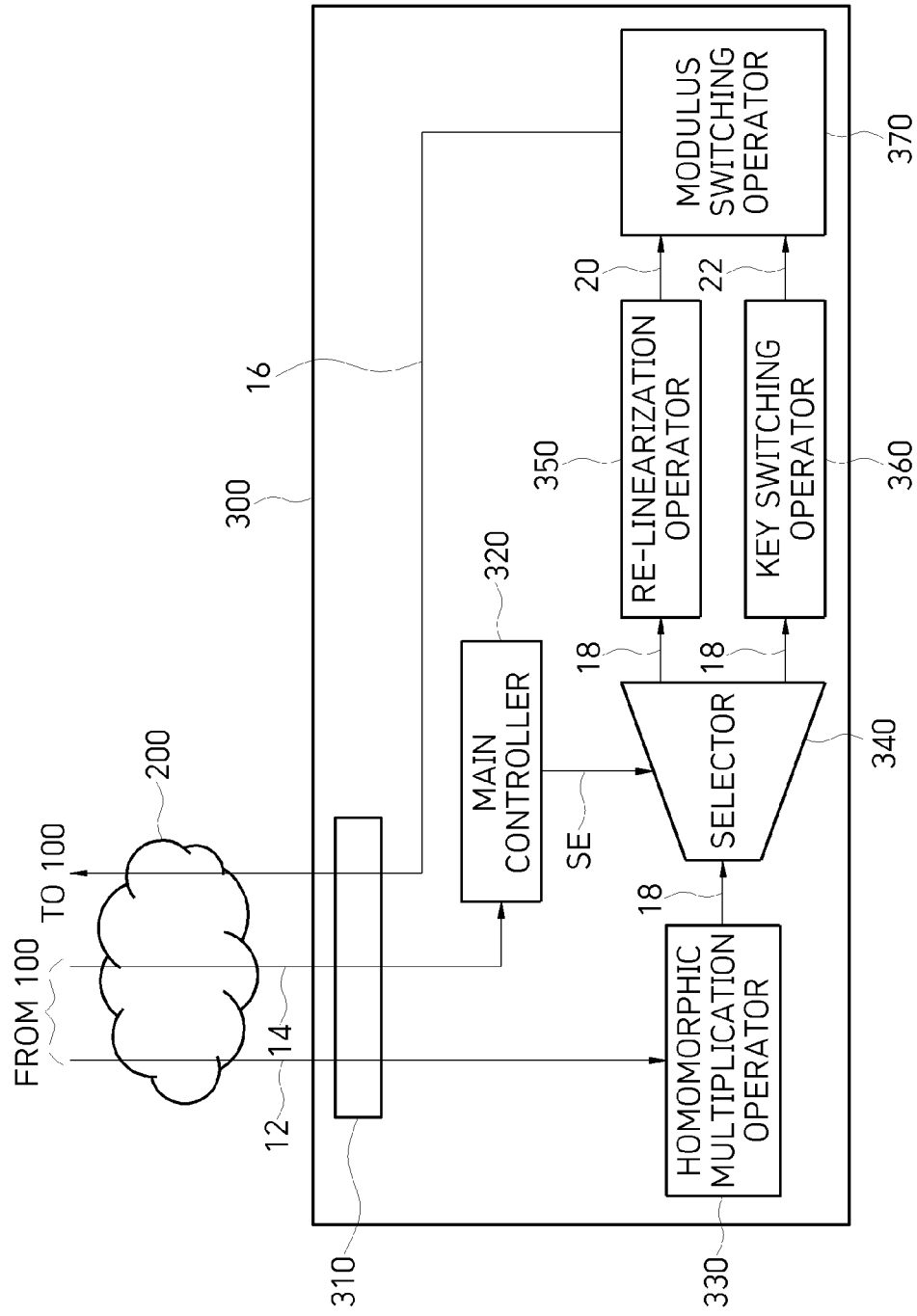
FIG. 3 is a schematic block diagram of a computing apparatus illustrated in FIG. 1.

FIG. 3 is a schematic block diagram of the computing apparatus 300 illustrated in FIG. 1.

Referring to FIG. 3, the computing apparatus 300 may be configured to integrate homomorphic operations defined in various homomorphic encryption schemes (for example, the BGV, BFV, and CKKS schemes).

To this end, the computing apparatus 300 may include a communication interface 310, a main controller 320, a homomorphic multiplication operator 330, a selector 340, a re-linearization operator 350, a key switching operator 360, and a modulus switching operator 370.

The communication interface 310 may receive the homomorphic ciphertext 12 and the encryption scheme information 14 from the homomorphic ciphertext generating apparatus 100 by using wired communication and/or wireless communication. Also, the communication interface 310 may transmit the resulting homomorphic ciphertext 16, which is an operation result of the modulus switching operator 370, to the homomorphic ciphertext generating apparatus 100 by using wired communication and/or wireless communication.

The main controller 320 may be an apparatus which controls and manages an overall operation of at least one element included in the computing apparatus 300 and may be configured to include at least one processor and at least one memory. The processor may include one or more of a CPU, an application processor, and a CP. The processor may execute an operation or data processing associated with at least one of the elements 310 and 330 to 370. The memory may include a volatile and/or non-volatile memory. The memory may store instructions or data associated with at least one of the elements 310 and 330 to 370.

Moreover, the main controller 320 may analyze an encryption scheme of the homomorphic ciphertext 12 received from the homomorphic ciphertext generating apparatus 100, based on the encryption scheme information 14 transferred from the communication interface 310, generate a selection signal SE corresponding to an analysis result, and input the selection signal SE to the selector 340. Here, the selection signal SE may be, for example, a one-bit signal representing "0" or "1".

In an embodiment, when an encryption scheme of the received homomorphic ciphertext 12 is the BFV or CKKS scheme (when upper bits of the homomorphic ciphertext 12 represent a message and lower bits of the homomorphic ciphertext 12 represent an error value), the selection signal SE may be "1", and when the encryption scheme of the received homomorphic ciphertext 12 is the BGV scheme (when the upper bits of the homomorphic ciphertext 12 represent the error value and lower bits of the homomorphic ciphertext 12 represent the message), the selection signal SE may be "0". In the following embodiment, it may be assumed that the selection signal SE is "1" when an encryption scheme is the BFV or CKKS scheme and the selection signal SE is "0" when the encryption scheme is the BGV scheme.

In an embodiment, the selection signal SE may be a signal for selecting one homomorphic operation process from among a first homomorphic operation process and a second homomorphic operation process. Here, the first homomorphic operation process may be defined as a process of sequentially performing a homomorphic multiplication operation, a re-linearization operation, and a modulus switching operation, and the second homomorphic operation process may be defined as a process of sequentially performing the homomorphic multiplication operation, a key switching operation, and the modulus switching operation.

In an embodiment, when the selection signal SE is "1" (when an encryption scheme is the BFV or CKKS scheme), the first homomorphic operation process may be selected, and when the selection signal SE is "0" (when the encryption scheme is the BGV scheme), the first homomorphic operation process may be selected.

The homomorphic multiplication operator 330 may perform a homomorphic multiplication operation and/or a modular operation (or a modular multiplication operation) on the homomorphic ciphertext 12 transferred from the communication interface 310. The homomorphic multiplication operator 330 may be referred to as a first operator, which is described in claims in the specification.

In an embodiment, the homomorphic multiplication operator 330 may be implemented as a logic circuit implemented based on a number theoretic transform (NTT) technique and a residue number system (RNS) technique, so as to perform high-speed parallel processing on the homomorphic multiplication operation and/or the modular operation.

The selector 340 may input an operation result of the homomorphic multiplication operation performed by the homomorphic multiplication operator 330 on the basis of the selection signal SE input from the main controller 320, to the re-linearization operator 350 or the key switching operator 360. To this end, the selector 340 may include, for example, a de-multiplexer.

In an embodiment, when the selection signal SE is "1" (when the encryption scheme is the BFV or CKKS scheme), the selector 340 may connect an output of the homomorphic multiplication operator 330 to an input of the re-linearization operator 350, and when the selection signal SE is "0" (when the encryption scheme is the BGV scheme), the selector 340 may connect the output of the homomorphic multiplication operator 330 to an input of the key switching operator 360.

Based on a selection operation of the selector 340, the computing apparatus 300 may selectively execute the first homomorphic operation process of sequentially performing the homomorphic multiplication operation, the re-linearization operation, and the modulus switching operation and the second homomorphic operation process of sequentially performing the homomorphic multiplication operation, the key switching operation, and the modulus switching operation.

The re-linearization operator 350 may perform a re-linearization operation or a bootstrapping operation on an operation result 18 input from the homomorphic multiplication operator 330, based on a selection operation of the selector 340. The re-linearization operator 350 may be referred to as a second operator, which is described in claims in the specification.

The key switching operator 360 may perform a key switching operation on the operation result 18 input from the homomorphic multiplication operator 330, based on a selection operation of the selector 340. The key switching operator 360 may be referred to as a third operator, which is described in claims in the specification.

The modulus switching operator 370 may perform a modulus switching operation on an operation result 20 of the re-linearization operator 350 or an operation result 22 of the key switching operator 360 to output a resulting homomorphic ciphertext.

The resulting homomorphic ciphertext may be transferred to the communication interface 310, and the communication interface 310 may transmit the resulting homomorphic ciphertext to the homomorphic ciphertext generating apparatus 100.

In an embodiment, the homomorphic multiplication operator 330, the selector 340, the re-linearization operator 350, the key switching operator 360, and the modulus switching operator 370 may be integrated into one dedicated chip. Here, the dedicated chip may be a field-programmable gate array (FPGA) chip, a system on chip (SoC) chip, or a semiconductor chip.

As described above, in an embodiment of the present invention, the homomorphic multiplication operator 330, the selector 340, the re-linearization operator 350, the key switching operator 360, and the modulus switching operator 370 may be integrated into one dedicated chip and the operators 350 and 360 selected by the selector 340 may selectively perform a homomorphic operation on an operation result of the homomorphic multiplication operator 330, and thus, may integrate different homomorphic operation processes defined in a homomorphic encryption scheme.

Figure 4:
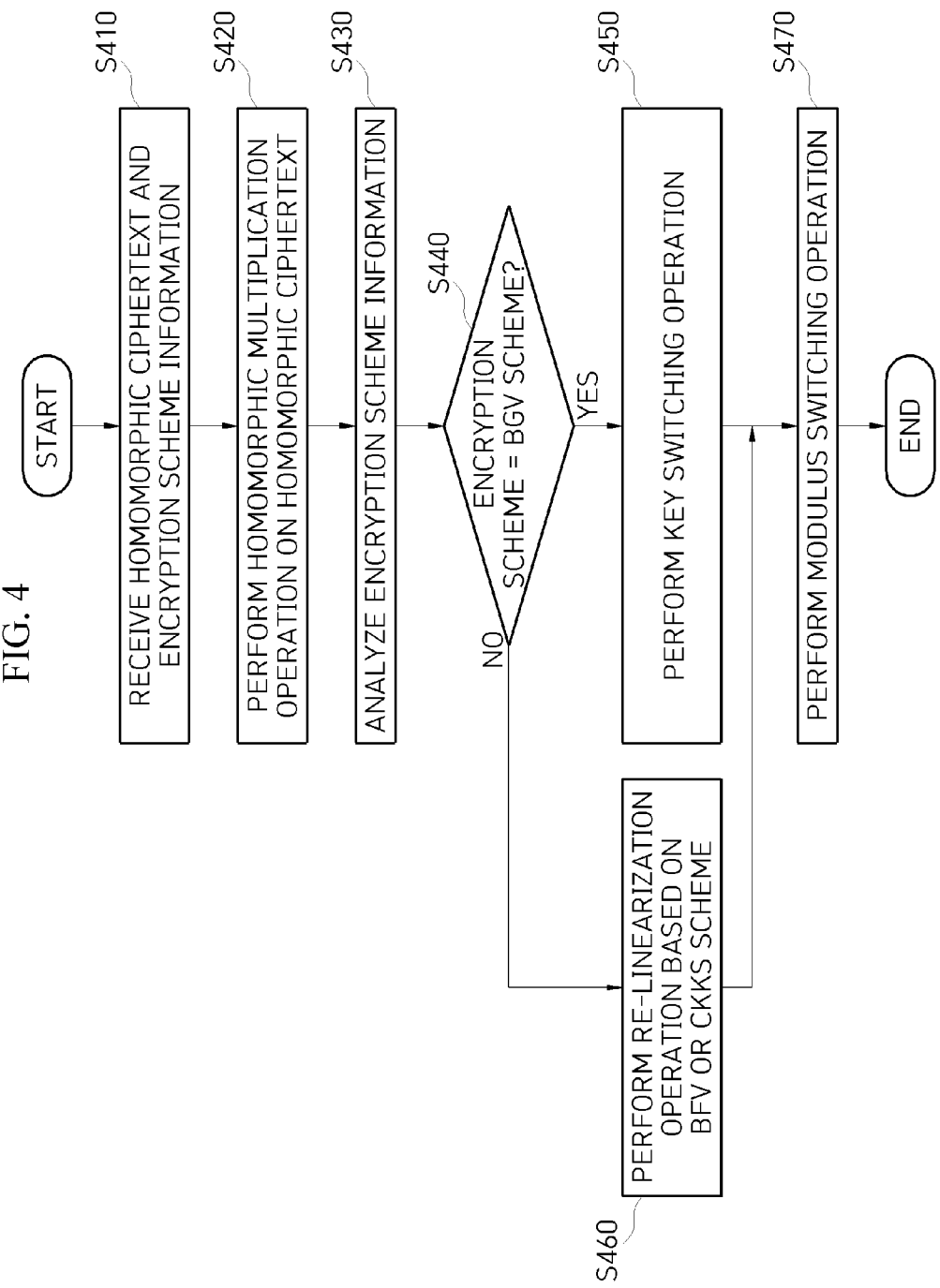
FIG. 4 is a flowchart for describing a method of integrating different homomorphic operations in a computing apparatus according to an embodiment of the present invention.

FIG. 4 is a flowchart for describing a method of integrating different homomorphic operations in a computing apparatus according to an embodiment of the present invention.

Referring to FIG. 4, first, in step S410, the communication interface 310 may receive the homomorphic ciphertext 12 and the encryption scheme information 14 from the homomorphic ciphertext generating apparatus 100.

In an embodiment, the encryption scheme information may be information for identifying an encryption scheme of the homomorphic ciphertext, and the encryption scheme may include, for example, the BGV, BFV, and CKKS schemes.

In an embodiment, the encryption scheme information may be information for identifying a bit position of an error value included in the homomorphic ciphertext.

Subsequently, in step S420, the homomorphic multiplication operator 330 may perform a homomorphic multiplication operation on the homomorphic ciphertext 12.

Subsequently, in steps S430 and S440, the main controller 320 may analyze the encryption scheme information to determine an encryption scheme of the homomorphic ciphertext.

In an embodiment, a step of determining the encryption scheme of the homomorphic ciphertext may be a step of analyzing the encryption scheme information to determine one operation among a re-linearization operation performed by a re-linearization operator and a key switching operation performed by a key switching operator.

In an embodiment, the step of determining the one operation may include a step of determining the re-linearization operation when the encryption scheme is the BFV or CKKS scheme and a step of determining the key switching operation when the encryption scheme is the BGV scheme.

In an embodiment, the step of determining the one operation may include a step of determining the re-linearization operation when a bit position of the error value is a lower bit and a step of determining the key switching operation when the bit position of the error value is an upper bit.

In an embodiment, the step of determining the one operation may include a step of determining the re-linearization operation when the bit position of the error value is a lower bit and a step of determining the key switching operation when the bit position of the error value is an upper bit.

In an embodiment, the step of determining the one operation may include a step of analyzing the encryption scheme information to determine an encryption scheme of the homomorphic ciphertext by the main controller, a step of generating a selection signal corresponding to the determined encryption scheme by using the main controller, and a step of connecting an output of the homomorphic multiplication operator to an input of the re-linearization operator or an input of the key switching operator by using the selector, based on the selection signal.

In an embodiment, the step of connecting the input may include a step of connecting an output of the homomorphic multiplication operator to an input of the re-linearization operator on the basis of the selection signal corresponding to the BFV scheme or the CKKS scheme and a step of connecting the output of the homomorphic multiplication operator to an input of the key switching operator on the basis of the selection signal corresponding to the BGV scheme.

Subsequently, in step S450, when the determined encryption scheme is the BGV scheme, the key switching operator 360 may perform a key switching operation, and in step S460, when the determined encryption scheme is the BGV scheme, the re-linearization operator 350 may perform a re-linearization operation based on the BFV or CKKS scheme.

Subsequently, in step S470, the modulus switching operator 370 may perform a modulus switching operation on an operation result of the key switching operation or the re-linearization operation.

According to the embodiments of the present invention, a homomorphic addition operator, a homomorphic multiplication operator, a re-linearization operator, a key switching operator, a modulus switching operator, and a selector may be integrated into one dedicated chip and a re-linearization operation of the re-linearization operator and a key switching operation of a key switching operator may be selectively performed based on a selection by the selector, and thus, homomorphic operation processes differently defined for each homomorphic encryption scheme may be integrated and homomorphic encryption application systems defined as different homomorphic encryption schemes may be integrated into one system.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of integrating different homomorphic operations in homomorphic encryption in a computing apparatus, the method comprising:
receiving a homomorphic ciphertext and encryption scheme information from a ciphertext generating apparatus by using a communication interface;
performing a homomorphic multiplication operation on the homomorphic ciphertext by using a homomorphic multiplication operator;
analyzing the encryption scheme information to determine one operation of a re-linearization operation performed by a re-linearization operator and a key switching operation performed by a key switching operator by using a main controller;
performing the determined one operation by using the re-linearization operator or the key switching operator; and
performing a modulus switching operation on an operation result of the determined one operation by using a modulus switching operator;
wherein the encryption scheme information comprises information for identifying a bit position of an error value included in the homomorphic ciphertext.

2. The method of claim 1, wherein the encryption scheme information comprises information for identifying an encryption scheme of the homomorphic ciphertext, and
the encryption scheme comprises a Brakerski, Gentry, and Vaikuntanathan (BGV) scheme, a Brakerski, Fan, and Vercauteren (BFV) scheme, and a Cheon, Kim, Kim, and Song (CKKS) scheme.

3. The method of claim 2, wherein the encryption scheme comprises one of a Brakerski, Gentry, and Vaikuntanathan (BGV) scheme, a Brakerski, Fan, and Vercauteren (BFV) scheme, and a Cheon, Kim, Kim, and Song (CKKS) scheme.

4. The method of claim 1, wherein the determining of the one operation comprises:
determining the re-linearization operation when the bit position of the error value is a lower bit; and
determining the key switching operation when the bit position of the error value is an upper bit.

5. The method of claim 1, wherein the determining of the one operation comprises:
analyzing the encryption scheme information to determine an encryption scheme of the homomorphic ciphertext by using the main controller;
generating a selection signal corresponding to the determined encryption scheme by using the main controller; and connecting an output of the homomorphic multiplication operator to an input of the re-linearization operator or the key switching operator by using a selector, based on the selection signal.

6. The method of claim 5, wherein the determined encryption scheme is one of a BGV scheme, a BFV scheme, and a CKKS scheme, and the connecting comprises:
connecting an output of the homomorphic multiplication operator to an input of the re-linearization operator, based on the selection signal corresponding to the BFV scheme and the CKKS scheme; and
connecting the output of the homomorphic multiplication operator to an input of the key switching operator, based on the selection signal corresponding to the BGV scheme.

7. A method of integrating different homomorphic operations in homomorphic encryption in a computing apparatus, the method comprising:
receiving a homomorphic ciphertext and encryption scheme information from a ciphertext generating apparatus by using a communication interface;
performing a homomorphic multiplication operation on the homomorphic ciphertext by using a homomorphic multiplication operator;
analyzing the encryption scheme information to determine one operation of a re-linearization operation performed by a re-linearization operator and a key switching operation performed by a key switching operator by using a main controller;
performing the determined one operation by using the re-linearization operator or the key switching operator; and
performing a modulus switching operation on an operation result of the determined one operation by using a modulus switching operator;
wherein the encryption scheme information comprises information for identifying an encryption scheme of the homomorphic ciphertext, and
the encryption scheme comprises a Brakerski, Gentry, and Vaikuntanathan (BGV) scheme, a Brakerski, Fan, and Vercauteren (BFV) scheme, and a Cheon, Kim, Kim, and Song (CKKS) scheme;
wherein the encryption scheme comprises one of a Brakerski, Gentry, and Vaikuntanathan (BGV) scheme, a Brakerski, Fan, and Vercauteren (BFV) scheme, and a Cheon, Kim, Kim, and Song (CKKS) scheme; and
wherein the determining of the one operation comprises:
determining the re-linearization operation when the encryption scheme is the BFV scheme or the CKKS scheme; and
determining the key switching operation when the encryption scheme is a BGV scheme.

8. A computing apparatus comprising:
a communication interface configured to receive a homomorphic ciphertext and encryption scheme information from a ciphertext generating apparatus;
a homomorphic multiplication operator configured to perform a homomorphic multiplication operation on the homomorphic ciphertext;
a second operator configured to perform a re-linearization operation on an operation result of the homomorphic multiplication operation;
a third operator configured to perform a key switching operation on the operation result of the homomorphic multiplication operation; and a fourth operator configured to perform a modulus switching operation on an operation result of the re-linearization operation or an operation result of the key switching operation, wherein the computing apparatus further comprises:

a main controller configured to generate a selection signal, based on the encryption scheme information; and a selector configured to input the operation result of the homomorphic multiplication operation to the second operator or the third operator, based on the selection signal;

wherein the encryption scheme information comprises information for identifying a bit position representing an error value in a bit string constituting the homomorphic ciphertext.

9. The computing apparatus of claim 8, wherein the first operator, the second operator, the third operator, the fourth operator, and the selector are integrated into one dedicated chip.

10. The computing apparatus of claim 8, wherein the main controller analyzes the encryption scheme information to determine an encryption scheme of the homomorphic ciphertext and generates the selection signal corresponding to the determined encryption scheme.

11. The computing apparatus of claim 10, wherein, when the encryption scheme is the BFV scheme or the CKKS scheme, the main controller generates the selection signal for inputting an operation result of the homomorphic multiplication operation to the second operator, and when the encryption scheme is a BGV scheme, the main controller generates the selection signal for inputting the operation result of the homomorphic multiplication operation to the third operator.

12. The computing apparatus of claim 8, wherein, when the bit position representing the error value is a lower bit, the main controller generates the selection signal for inputting an operation result of the homomorphic multiplication operation to the second operator, and when the bit position representing the error value is an upper bit, the main controller generates the selection signal for inputting the operation result of the homomorphic multiplication operation to the third operator.

13. The computing apparatus of claim 8, wherein the selector comprises a de-multiplexer.

14. The computing apparatus of claim 8, wherein the first operator comprises a logic circuit implemented based on a number theoretic transform (NTT) technique and a residue number system (RNS) technique, so as to perform high-speed parallel processing on the homomorphic multiplication operation.

* * * * *